US008486856B2

United States Patent
Henning et al.

(10) Patent No.: US 8,486,856 B2
(45) Date of Patent: Jul. 16, 2013

(54) PROCESS PRODUCING ACTIVATED CARBON HAVING A HIGH CATALYTIC ACTIVITY

(75) Inventors: Klaus-Dirk Henning, Essen (DE); Wolfgang Bongartz, Moenchengladbach (DE); Nicolai Daheim, Essen (DE); Thomas Scharf, Essen (DE)

(73) Assignee: CarboTech AC GmbH, Essen (DE)

( * ) Notice: Subject to any disclaimer, the term of this patent is extended or adjusted under 35 U.S.C. 154(b) by 226 days.

(21) Appl. No.: 12/443,833

(22) PCT Filed: Sep. 13, 2007

(86) PCT No.: PCT/EP2007/007960
§ 371 (c)(1),
(2), (4) Date: May 18, 2009

(87) PCT Pub. No.: WO2008/040438
PCT Pub. Date: Apr. 10, 2008

(65) Prior Publication Data
US 2010/0034726 A1 Feb. 11, 2010

(30) Foreign Application Priority Data
Oct. 4, 2006 (DE) .......................... 10 2006 046 880

(51) Int. Cl.
*C01B 31/12* (2006.01)
(52) U.S. Cl.
USPC ........................................................ 502/423

(58) Field of Classification Search
USPC ........................................................ 502/423
See application file for complete search history.

(56) References Cited

U.S. PATENT DOCUMENTS

| | | | | |
|---|---|---|---|---|
| 3,910,849 A * | 10/1975 | Kawabata et al. | ............ | 502/435 |
| 3,951,856 A * | 4/1976 | Repik et al. | .................... | 502/428 |
| 3,953,345 A | 4/1976 | Saito et al. | | |
| 5,187,141 A * | 2/1993 | Jha et al. | ........................ | 502/432 |
| 5,670,124 A | 9/1997 | Itoga et al. | | |
| 6,310,000 B1 * | 10/2001 | Matviya et al. | ................ | 502/423 |
| 6,534,442 B1 | 3/2003 | Vaughn et al. | | |

FOREIGN PATENT DOCUMENTS
WO 01/05704 A1 1/2001

OTHER PUBLICATIONS

International Search Report for PCT/EP2007/007960 mailed Dec. 27, 2007, two pages.
International Preliminary Report on Patentability for PCT/EP2007/007960 mailed May 14, 2009, six pages.

\* cited by examiner

*Primary Examiner* — Stuart Hendrickson
(74) *Attorney, Agent, or Firm* — Rankin, Hill & Clark LLP

(57) ABSTRACT

Process for producing activated carbon having a high catalytic activity, in which a carbonaceous material is brought into contact with nitrogen compounds, wherein the carbonaceous material is partially gasified with a mixture of steam, nitrogen and $CO_2$ at temperatures above 800° C. in a manner known per se in a multistage fluidized bed and wherein a nitrogen compound is added into the furnace and/or at least one stage of the multistage fluidized bed.

8 Claims, No Drawings

PROCESS PRODUCING ACTIVATED CARBON HAVING A HIGH CATALYTIC ACTIVITY

The invention concerns a process for the production of activated carbon having a high catalytic activity according to the preamble of claim 1.

It is known from EP 1 200 342 B1 that the catalytic activity of activated carbons can be increased by the treatment with nitrogen compounds. Two basic processes are thus disclosed.

The first process comprises the treatment of an activated carbon with compounds containing nitrogen.

The second process comprises that a carbonaceous material is brought into contact with nitrogen compounds before it is carbonized or activated.

The disadvantage of these processes is that only a relatively small part of the fed amount of nitrogen contained in the nitrogen compound is inserted in the carbon framework and thus increases the catalytic activity. In any case, additional process steps are also necessary for the production of the activated carbon with high catalytic activity.

The invention is based on the problem of providing a simple and economical process for the production of activated carbon with high catalytic activity which makes additional process steps unnecessary.

This problem is solved in that a carbonaceous material (i.e. a material containing carbon) is partially gasified in a multistage fluidised bed in a manner known per se at temperatures above 800° C. with a mixture of steam (i.e. water vapour), nitrogen and $CO_2$ and that in the furnace (i.e. combustion chamber) and/or in at least one stage of the multistage fluidised bed a nitrogen compound (i.e. a compound containing nitrogen) is fed.

Further developments are defined according to the features of the sub-claims.

The invention is based on the basic idea that the compound containing nitrogen is fed during the conventional production process for activated carbon in a multistage fluidised bed. A multistage fluidised bed is to be understood as a fluidised bed which has at least two to a maximum of eight fluidised bed stages.

The experiments surprisingly showed that the activity of the thus produced activated carbon by the addition of a nitrogen compound in the furnace or in the individual fluidised bed stages can be specifically controlled and that the activated carbons can be produced in a simple way.

All known materials which contain carbon are suitable for the production of activated carbon such as coconut shells, coal, lignite coke, peat coke or polymers.

Urea is primarily used as a nitrogen compound. It is also possible to use hexamethylenetetramine, polyacrylonitrile or melamine.

As a preferred embodiment an aqueous urea solution is added as the nitrogen compound in the multistage fluidised bed. The concentration of the urea solution is 45%. It is used in an amount of 2 to 10 kg urea based on 100 kg of the carbonaceous material. An amount of urea of 5 to 6 kg based on 100 kg of the carbonaceous material has proved to be ideal.

The catalytic activity of the produced activated carbon is determined by measuring the conversion of NO. It is known that activated carbons, which have a high catalytic activity in view of the conversion of NO, also possess an increased catalytic activity in the $SO_2$ oxidation, in the removal of chloramines, the decomposition of peroxide, the $H_2S$ oxidation and in numerous other chemical reactions.

Determination of the NO Conversion

The conversion of NO is determined at a temperature of 120° C. with a model flue gas (400 ppm NO, 400 ppm $NH_3$, 22 vol.-% $O_2$ and 17 vol. % $H_2O$, moiety $N_2$).

1.06 l dried activated carbon is filled into a reactor and the model flue gas is passed through at a reaction temperature of 120° C. The contact time amounts to 10 seconds. The NO penetration concentration is registered during measurement and the conversion, with reference to the NO starting concentration, is calculated from the NO concentration in the pure gas after 20 hours.

The invention is described in more detail in the following on the basis of procedural examples.

EXAMPLE 1 (COMPARATIVE EXAMPLE)

Production of the activated carbon is carried out in an eight-stage fluidised bed reactor. The furnace temperature is 800 to 940° C. The fluidising gas is generated by burning natural gas. In addition 300 kg steam is fed per hour.

600 kg carbonaceous material is added per hour to the fluidised bed reactor. The discharge of end product is 400 kg per hour. No urea solution is added. The activity of the produced activated carbon is determined by measuring the conversion of NO. The produced activated carbon has a nitrogen content of 0.4 wt.-%. The catalytic activity according to the above described test amounts to a 45% conversion of NO.

EXAMPLE 2

50 l of a 45% urea solution are fed per hour to the furnace of the eight-stage fluidised bed reactor. The other conditions for the production of activated carbon are not altered. The ratio of urea to the material containing carbon is 4.2 kg urea per 100 kg material containing carbon.

The nitrogen content of the thus produced activated carbon is 1.0 wt.-%. A NO conversion of 87% was measured in the NO test.

EXAMPLE 3

In addition to adding 50 l of a 45% urea solution in the furnace of the eight-stage fluidised bed reactor, 10 l of urea solution are added to the third fluidised bed stage. The nitrogen content of the thus produced activated carbon amounts to 1.26 wt-%. A NO conversion of 89% was measured. The ratio amounts to 5.0 kg urea per 100 kg material containing carbon.

EXAMPLE 4

In addition to adding 50 l of urea solution per hour in the furnace of the eight-stage fluidised bed reactor, 30 l of urea solution per hour are fed to the third fluidised bed stage. The nitrogen content of the thus produced activated carbon amounts to 1.41 wt.-%. A conversion in the test apparatus of 91% NO is measured. The ratio amounts to 5.9 kg urea per 100 kg carbonaceous material.

EXAMPLE 5

In addition to adding 60 l urea solution per hour in the furnace of the eight-stage fluidised bed reactor, another 20 l of urea solution is fed to the second fluidised bed stage and a further 20 l of urea is fed to the third fluidised bed stage. The nitrogen content of the thus produced activated carbon amounts to 1.5 wt.-%. A conversion of 92% NO is measured. The ratio of urea to the carbonaceous material amounts to 8.3 kg urea to 100 kg of carbonaceous material.

The examples confirm that the process for the production of activated carbon by feeding a nitrogen compound in the furnace or in the individual fluidised bed stages of the multistage fluidised bed, can be modified in a simple manner for the production of an activated carbon with a high catalytic activity in view of the NO conversion.

In the examples, urea was chosen as a nitrogen compound. The urea concentration was varied between 4.2 kg per 100 kg carbonaceous material and 8.3 kg per 100 kg carbonaceous material. The trial results emphasize that a urea amount of 5 to 6 kg per 100 kg material containing urea represents the ideal amount from a technical and economical point of view. A further increase from 5.9 to 8.3 kg per 100 kg only leads to a minor improvement of the catalytic activity.

The invention claimed is:

1. A process for the production of activated carbon with high catalytic activity, in which a carbonaceous material is brought into contact with a nitrogen compound,
   wherein the carbonaceous material is partially gasified in a multistage fluidized bed at temperatures above 800° C. with a mixture of steam, nitrogen and $CO_2$ and
   wherein the multistage fluidized bed includes a furnace and 2 to 8 fluidized bed stages and,
   wherein the nitrogen compound is fed into at least one of (a) the furnace and (b) at least one of the fluidized bed stages.

2. The process according to claim 1, wherein the carbonaceous material is selected from the group consisting of coconut shells, coal, lignite coke, peat coke and polymers.

3. The process according to claim 2, wherein the nitrogen compound is added in the form of an aqueous urea solution.

4. The process according to claim 3, wherein the urea is fed in an amount of 2 to 10 kg urea based on 100 kg carbonaceous material.

5. The process according to claim 3, wherein the urea is fed in an amount of 5 to 6 kg urea based on 100 kg carbonaceous material.

6. The process according to claim 1, wherein the nitrogen compound is added in the form of an aqueous urea solution.

7. The process according to claim 6, wherein the urea is fed in an amount of 2 to 10 kg urea based on 100 kg carbonaceous material.

8. The process according to claim 6, wherein the urea is fed in an amount of 5 to 6 kg urea based on 100 kg carbonaceous material.

* * * * *